J. B. FREEMAN.
Sheep Rack.
No. 38,896.
Patented June 16, 1863.
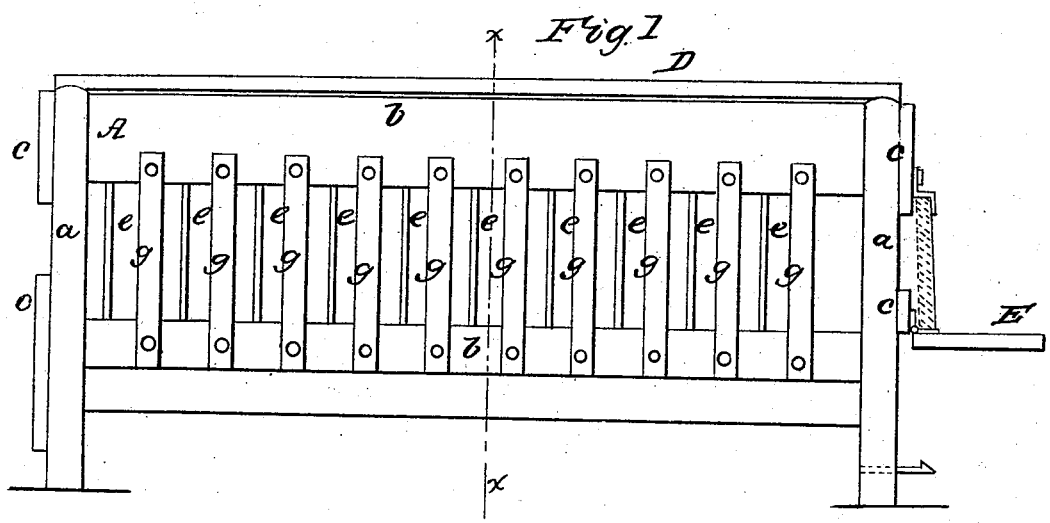
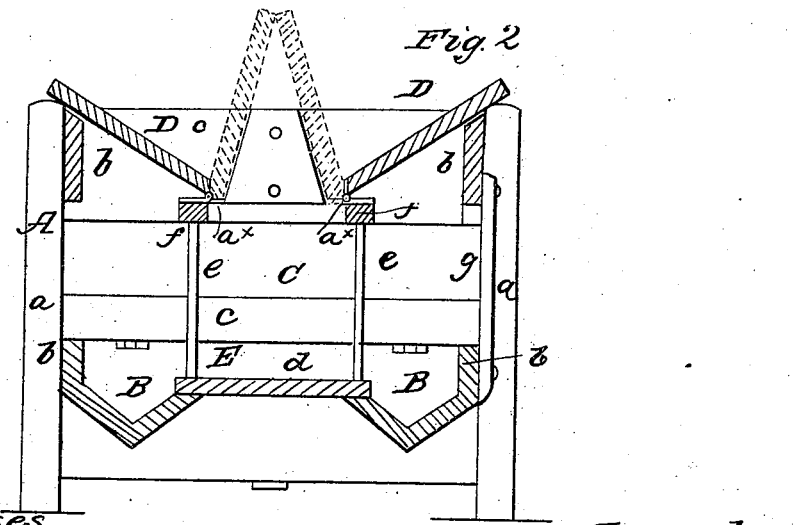

UNITED STATES PATENT OFFICE.

JAMES BYRON FREEMAN, OF LEBANON, NEW HAMPSHIRE.

IMPROVEMENT IN SHEEP-RACKS.

Specification forming part of Letters Patent No. 38,896, dated June 16, 1863.

*To all whom it may concern:*

Be it known that I, JAMES BYRON FREEMAN, of Lebanon, in the county of Grafton and State of New Hampshire, have invented a new and Improved Sheep-Rack; and I do hereby declare that the following is a full, clear, and exact description of the same, reference being had to the accompanying drawings, making a part of this specification, in which—

Figure 1 is a side view of my invention; Fig. 2, a transverse vertical section of the same, taken in the line $x\,x$, Fig. 1.

Similar letters of reference indicate corresponding parts in the two figures.

This invention consists in combining a hay-rack and feed-troughs in such a manner that a very convenient and economical feeding device is obtained, and one which will prevent the waste of fodder by the sheep.

To enable those skilled in the art to fully understand and construct my invention, I will proceed to describe it.

A represents a rectangular frame composed of four uprights, $a$, connected by two bars, $b\,b$, at each side, and two bars, $c\,c$, at each end. In the lower part of the frame A there are placed longitudinally two troughs, B B—one at each side—said troughs being of V form in their transverse section, as shown in Fig. 2. Between the two troughs B B there is a horizontal strip or board, $d$, which forms the bottom of a hay-rack, C. The sides of this rack are formed of vertical rods $e$, the upper ends of which are fitted in longitudinal bars $f$, placed in the frame A, (see Fig. 2,) and to these bars $f$ there are attached by hinges $a^x$ lids D, which may be turned over in an inclined position, so as to rest the top bars, $b$, of the frame and form covers for the troughs B B. The lids may also be turned so that their upper ends will be in contact directly over the hay-racks C, as shown in red outline in Fig. 2. At one end of the frame A there is a flap, E, which, when down, covers the ends of the troughs B, and when raised admits of the troughs being readily cleaned out. The lids D prevent hay falling into the troughs B B, and the contents of the racks may be readily reached by the sheep through or between the rods $e$. Grain is placed in the troughs B B. It will therefore be seen that both the grain and hay are accessible to the sheep. By having the troughs B of V form in their transverse section the young lambs cannot readily stand in them and draw and scatter hay out of the rack—a result which would be sure to happen with flat-bottom troughs. One side of the frame A may have vertical slats $g$ attached to it at suitable distances apart. These slats serve as subdivisions, and prevent the sheep from crowding each other. The slats, however, can only be used for sheep without horns, and hence one side of the device can only be provided with them.

Having thus described my invention, what I claim as new, and desire to secure by Letters Patent, is—

The combination of the hay-rack C and troughs B B, placed within a frame, A, provided with lids D D, and all arranged as and for the purpose herein set forth.

JAMES BYRON FREEMAN.

Witnesses:
A. H. CRAGIN,
H. W. CRAGIN.